United States Patent Office 3,517,089
Patented June 23, 1970

3,517,089
N-PHENYL-N-ALKYL ESTER PHOSPHATE ACETAMIDES
Peter E. Newallis, Overland Park, Kans., Pasquale Lombardo, Chevy Chase, Md., and Francis A. Spano, Millington, N.J., assignors to Allied Chemical Corporation, New York, N.Y., a corporation of New York
No Drawing. Filed June 20, 1967, Ser. No. 647,321
Int. Cl. C07f 9/24; A01n 9/36
U.S. Cl. 260—942                                    10 Claims

ABSTRACT OF THE DISCLOSURE

N-phenyl-N-alkyl ester phosphate acetamides useful as insecticides of the general formula:

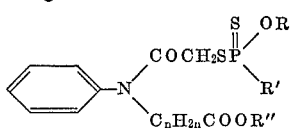

where

R=alkyl radical having 1–5 carbon atoms
R'=alkyl or alkoxy radical having 1–5 carbon atoms
R"=alkyl radical having 1–5 carbon atoms
n=an integer varying from 1–6

The above compounds are prepared by reacting ammonium salts of phosphoric acid diesters with N,N-disubstituted chloroacetamides.

BACKGROUND OF THE INVENTION

This invention relates to a new class of phosphates and phosphonates useful as pesticides and in particular to a new class of N,N-disubstituted phosphate acetamides useful as insecticides and a method of producing same.

The requirements for useful insecticides vary depending upon the kind of application intended. To be successful, an insecticide must, of course, be toxic to the insect to be controlled. For some applications, it is desirable that the insecticide be stable and have extended residual activity; for other applications, it is desirable that its useful life be short. For use by unskilled personnel, it should be relatively nontoxic to mammals; in other cases, particularly where it is to be applied only by skilled personnel, the mamalian toxicity is less of a factor. Of course, where the insecticide is to be applied to the foliage or roots of plants, or to soil in which the plant is growing, it must be nonphytotoxic, at least at the insecticidal dosage.

It is an object of this invention to provide a new class of phosphates and phosphonates as pesticides.

It is another object of this invention to provide a new class of N,N-disubstituted phosphate acetamides.

It is another object of this invention to provide a process for producing a new class of N,N-disubstituted phosphate acetamides useful as insecticides.

SUMMARY OF THE INVENTNON

The following general structures represent the compounds of the invention:

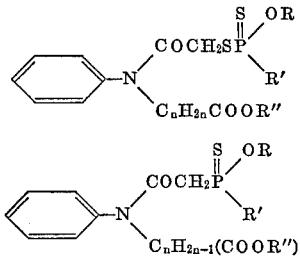

wherein:

R=alkyl radical having 1–5 carbon atoms
R'=alkyl or alkoxy having 1–5 carbon atoms
R"=alkyl having 1–5 carbon atoms
n=1–6

These compounds are viscous liquids which are soluble in many organic solvents but are essentially insoluble in water. They have an outstanding acaricidal activity, and are characterized by low toxicity for warm-blooded animals. Accordingly, they can be used safely and very effectively for combatting eggs and active stages of spider mites in the protection of plants. These compounds can also be used as active toxicants in compositions for the control of a number of insect organisms such as flies, beetles, worms, roaches, cattle grubs, and aphids. Furthermore, the toxic potency of this class of compounds is such as to permit their effective use as dilute solutions in soaps, sprays, paints, and oils.

The synthesis of this class of compounds may be carried out by reacting a N,N-disubstituted chloro-acetamide with an ammonium salt of a diester of phosphoric acid as illustrated by the following reaction:

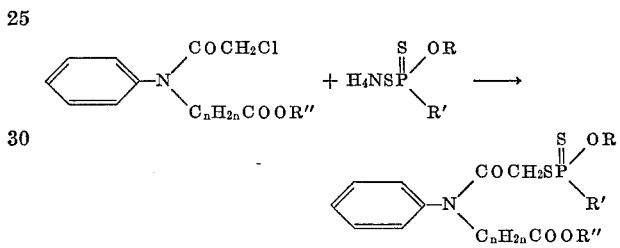

wherein R, R', R" and n have the same significance as indicated above. The reaction may be carried out in any common inert organic solvent such as acetone, benzene, dimethylformamide or carbon tetrachloride. Approximate stoichiometric amounts of the reactants are used. The mixture is stirred for approximately 2–5 days, preferably 3–4 days at ambient temperatures generally ranging from 20–40° C., preferably 20–30° C. and at atmospheric pressure although higher pressures may be used. After the completion of the reaction the solvent is removed under reduced pressure. The product residue is then taken up in a water-immiscible organic solvent, such as methylene chloride, and washed several times with water. The organic layer is then dried over a drying agent, such as anhydrous magnesium sulfate, and the organic solvent is removed under reduced pressure thereby providing a viscous oil residue.

DESCRIPTION OF THE PREFERRED EMBODIMENT

Preparation of typical compounds of the invention are described in the following examples. The examples are intended to be illustrative and exemplary in character, only, and are not to be considered as limiting the invention in any way. The reaction conditions can also be modified without departing from the spirit of the invention.

EXAMPLE I

To a solution of 2.5 grams of α-chloro [N-2-methoxycarbonyl ethyl-N-phenyl] acetamide in 50 ml. of acetone was added 5 grams (150% excess) of ammonium O,O-diethyl phosphorodithioate in 25 ml. of acetone. The mixture was stirred at ambient temperature for 3 days, after which the acetone was flashed off under reduced pressure. The residue was extracted with 50 ml. of methylene chloride and washed twice with 25 ml. of water. Then the organic layer was dried over anhydrous magnesium sulfate, and the methylene chloride was removed under reduced pressure. The residue, N-phenyl-N-(2 - carbomethoxyethyl) - (O,O-diethyl phosphinothioylthio)acetamide, was a yellow, viscous oil weighing 4 grams and representing a yield of 99%.

Table I sets forth typical examples of compounds, including the compound of Table I, which were prepared in the same manner as the process described in Example I.

TEST II

Non-systemic primary test for two-spotted spider mites

A solution was prepared of 4.8 gm. of Compound 3 in 100 cc. of acetone. The solution was diluted with water to a concentration of 8 oz./100 gal. of Compound 3.

Young horticultural (cranberry) bean plants in 2½ inch pots were infested with mites (all stages) one day before treatment. In treating plants the upper surface was sprayed with the solution for two seconds and the lower or under surface was sprayed for 5 seconds. The

TABLE I

| Compound | Analysis Calculated | Found |
|---|---|---|
| Example: 1 — Phenyl-N(COCH$_2$SP(OEt)$_2$=S)(CH$_2$CH$_2$COOCH$_3$) | S=15.8 | S=15.8 |
| 2 — Phenyl-N(COCH$_2$SP(OEt)$_2$=S)(CH$_2$CH(CH$_3$)COOCH$_3$) | C=48.7, H=6.2, N=3.34 | C=48.8, H=5.8, N=3.4 |
| 3 — Phenyl-N(COCH$_2$SP(OEt)$_2$=S)(CH$_2$COOEt) | C=47.3, H=5.97, N=3.45 | C=47.3, H=6.03, N=3.37 |
| 4 — Phenyl-N(COCH$_2$SP(OEt)$_2$=S)(CH(CH$_3$)COOEt) | | |
| 5 — Phenyl-N(COCH$_2$SP(OEt)$_2$=S)(CH(COOEt)CH$_2$COOEt) | C=48.8, H=6.18, N=2.85 | C=49.0, H=6.1, N=2.96 |

In using the compounds of this invention as insecticides, the undesirable organism may be killed by contacting the insect directly, by contacting the insect through its habitat, or by contacting the insect through its food prior to ingestion with toxic amounts of the compounds. Standardized tests were conducted to determine the effectiveness as insecticides of the compounds listed in Table I against adult houseflies, two-spotted spider mites, and Mexican bean beetle larvae. The tests were non-systemic.

The following non-systemic tests were performed to illustrate the use of the compounds of Table I in controlling insects and acarides. The results of the tests are listed in Table II.

TEST 1

Non-systemic primary test for Mexican bean beetle larvae

A solution consisting of 4.8 gm. of Compound 3 was mixed in 100 cc of acetone. The solution was diluted with water so that the concentration of Compound 3 was 1 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 3rd instar larvae were then confined on each plant with 6 inch screen wire spheres. Mortality and feeding records were made 3 days after treatment.

spray was delivered from a DeVilbiss atomizer nozzle operated at 20 p.s.i with the plant about 18″ from nozzle. The approximate volume of spray on the upper surface was 0.13 cc. and on the lower surface was 0.32 cc. Following the treatment, the potted plants were placed in irrigated trays in the greenhouse and initial kills of adults were recorded three days later. Residual and ovicidal observations were made 7–8 days after treatment, which allowed ample time for the eggs to hatch under greenhouse conditions. One leaf from each plant was used to make 3-day counts, and the remaining leaf on each plant was used to determine residual and ovicidal activity.

TEST III

Non-systemic primary test for house fly adults

Dry food (6 parts powdered non-fat dry milk, 6 parts granulated sugar and 1 part powdered egg) was mixed with an acetone solution of Compound 3 so that the food contained 0.125% of the compound. The mixture was allowed to dry and then repulverized. Wettable powders are mixed with the dry food with the aid of mortar and pestle. The treated food was placed in emergence cages containing 50 fly pupae. Cages containing untreated food were used as checks. Examination of each cage was made periodically for 8 days to determine emergence, condition of flies, and acute toxicity.

Similar tests were performed for Compounds 1, 2, 4, and 5, the results of which are also disclosed with Compound 3 in Table II.

TABLE II.—RESULTS OF NON-SYSTEMATIC PRIMARY TESTS

| Example No. | Test I Mexican bean beetle larvae (4.8 gm./100 cc. acetone) percent mortality | Test II Two-spotted spider mite (4.8 gm./100 cc. acetone) percent mortality | Test III House fly adults (.0125% dry bait) percent 8 day kill |
|---|---|---|---|
| 1 | | | 100 |
| 2 | 100 | 84.4 | 100 |
| 3 | [1] 100 | [2] 100 | 100 |
| 4 | [1] 100 | [3] 77.8 | 100 |
| 5 | [1] 100 | [4] 59.5 | 100 |

[1] Used in dil. of 1 oz./gal. H₂O.
[2] Used in dil. of 8 oz./10 gal. H₂O.
[3] Used in dil of 4 oz/100 gal. H₂O.
[4] Used in dil. of 8 oz./100 gal. H₂O.

The illustrations of the method that constitutes the invention given above are not intended to limit the invention in any way but are merely descriptive of the method.

We claim:

1. A compound of the formula:

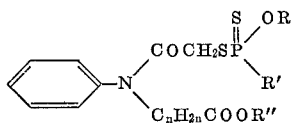

wherein:
R and R'' represent alkyl radicals having 1–5 carbon atoms,
R' represents an alkoxy radical having 1–5 carbon atoms, and
n is an integer equal to 1–6.

2. A compound of the formula of claim 1 in which R represents an ethyl radical, and R' represents an ethoxy radical.

3. A compound of the formula of claim 2 in which R'' represents an ethyl radical.

4. A compound of the formula of claim 2 in which R'' represents a methyl radical.

5. A compound of claim 1 having the formula:

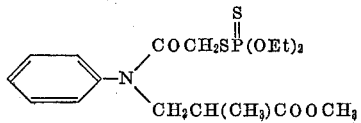

6. A compound of claim 1 having the formula:

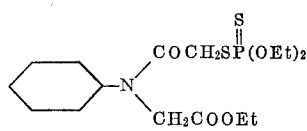

7. A compound of the formula:

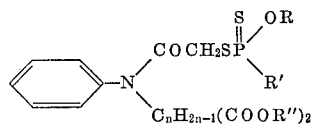

wherein:
R and R'' represent alkyl radicals having 1–5 carbon atoms.
R' represents an alkoxy radical having 1–5 carbon atoms, and
n is an integer equal to 1–6.

8. A compound of the formula of claim 7 in which R represents an ethyl radical and R' represents an ethoxy radical.

9. A compound of the formula of claim 8 in which R'' represents an ethyl radical.

10. A compound of claim 7 having the formula:

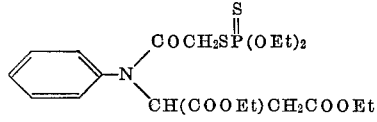

References Cited

UNITED STATES PATENTS 2,912,452  11/1959  Schrader et al. _____ 260—943
3,022,215  2/1962  Schuler _____ 260—943 XR CHARLES B. PARKER, Primary Examiner A. H. SUTTO, Assistant Examiner U.S. Cl. X.R.

260—943, 978; 424—212